(No Model.)

C. LEAVITT & C. G. CANFIELD.
CAR WHEEL.

No. 310,597. Patented Jan. 13, 1885.

WITNESSES
Geo. W. King
Wm. M. Monroe

INVENTOR
Charles Leavitt
Charles G. Canfield
by Leggett & Leggett
Attorneys

UNITED STATES PATENT OFFICE.

CHARLES LEAVITT AND CHARLES G. CANFIELD, OF CLEVELAND, OHIO.

CAR-WHEEL.

SPECIFICATION forming part of Letters Patent No. 310,597, dated January 13, 1885.

Application filed April 29, 1884. (No model.)

*To all whom it may concern:*

Be it known that we, CHARLES LEAVITT and CHARLES G. CANFIELD, of Cleveland, in the county of Cuyahoga and State of Ohio, have invented certain new and useful Improvements in Car-Wheels; and we do hereby declare the following to be a full, clear, and exact description of the invention, such as will enable others skilled in the art to which it pertains to make and use the same.

Our invention relates to improvements in car-wheels, the object being to provide a car-wheel with two treads, the one made flangeless and adapted to operate in conjunction with lateral guiding-wheels, and the other tread of larger diameter and provided with flanges, and adapted to operate on a railroad-track in the usual manner.

With these objects in view our invention consists in certain features of construction and in combination of parts hereinafter described, and pointed out in the claims.

Figure 1:
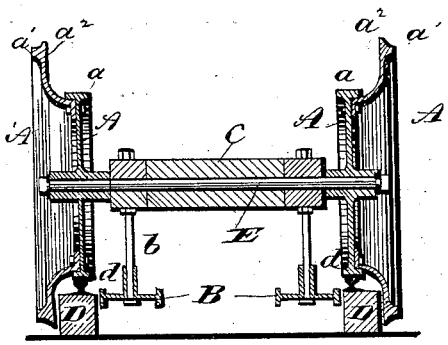
Figure 3:
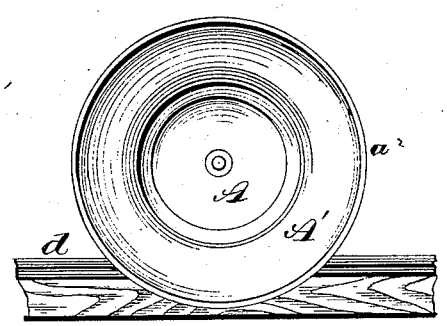
Figure 2:
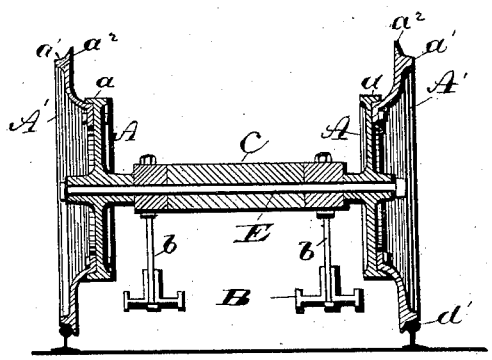
Figure 4:
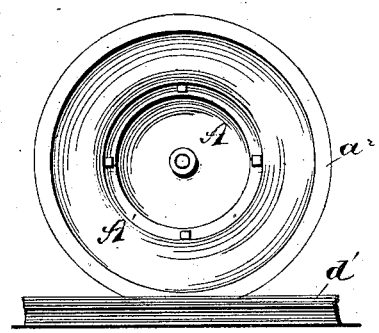

In the accompanying drawings, Figure 1 is a vertical section of our improved wheels in position, with the flangeless treads engaging the rails. Fig. 2 is a view in side elevation of one of our improved wheels with the flangeless tread in position on the rail. Fig. 3 is a transverse vertical sectional view with the flanged treads engaging the rails. Fig. 4 is a side elevation of the same, with the flanged treads engaging the rail.

A represents the central portion or wheel proper, and A' the extension. These parts may be bolted or riveted together, as shown, or may be integral, if preferred. The part A has a flangeless tread, $a$, engaging the rails $d$, and is guided by lateral wheels B, journaled on the vertical axles $b$, that are secured to the truck-frame C. The wheels A are journaled on the axle E, that is rigidly secured to the truck-frame. This combination of flangeless wheels and lateral guiding-wheel is desirable on roads when a high speed is required. Along the route and at the termini of such rapid-transit lines there are usually various connecting lines of steam-railways.

It is desirable to have at least a portion of the cars so constructed that they may be operated either on the rapid-transit lines or on the street-railways, so that they may be switched from one line to another, as required. To accomplish this end we have devised the attachment A', that projects laterally, so as to clear the truck-supports D of the rapid-transit line, and of such enlarged diameter, as compared with the part A, that when the part A' is on the track $d'$, as shown in Fig. 2, the part A and the lateral wheel are raised some distance above the road-bed. The part A' has the tread $a'$, provided in the ordinary manner with the flange $a^2$, and the respective treads $a$ and $a'$ are of course concentric with each other. The lateral wheels B are not necessarily in line with the wheels A, but may be located nearer to the ends of the truck than the axles E, or toward the center of the truck, in which case, if preferred, the part A' may be on the inside of the wheel A. The location of the part A' inside or outside of the wheel A will depend on the width of the street-car track, that may be wider or narrower than the rapid-transit track, as may be found advisable.

What we claim is—

1. A car-wheel consisting of an inner or flangeless tread and an outer or flanged tread, the latter being greater in diameter than the flangeless tread, substantially as set forth.

2. The combination, with a car-wheel having a flanged tread and a flangeless tread arranged concentric with the flanged tread, of horizontal guide-wheels B, substantially as set forth.

In testimony whereof we sign this specification, in the presence of two witnesses, this 11th day of April, 1884.

CHARLES LEAVITT.
CHARLES G. CANFIELD.

Witnesses:
ALBERT E. LYNCH,
CHAS. H. DORER.